June 6, 1950 P. SCHILDKNECHT 2,510,934
MIXER
Filed Sept. 2, 1947 2 Sheets-Sheet 1
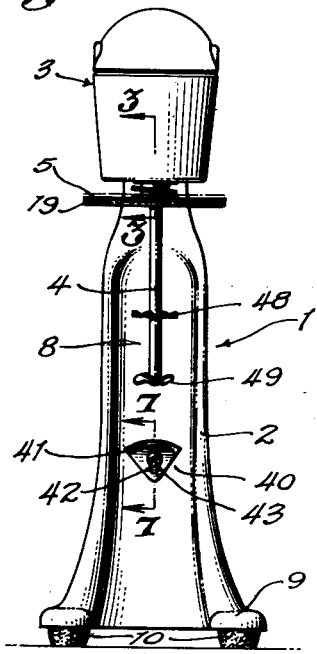
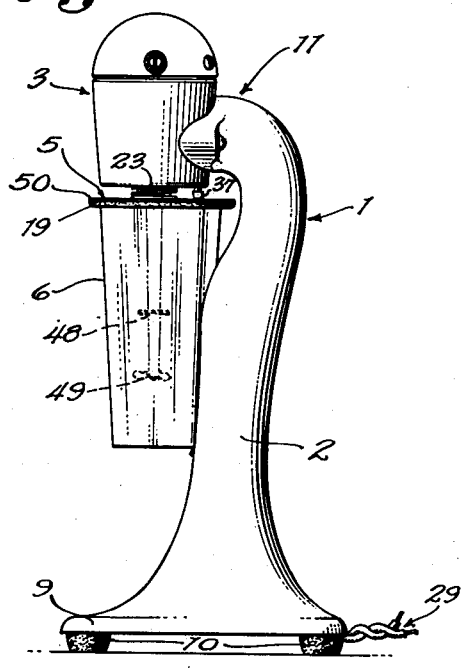
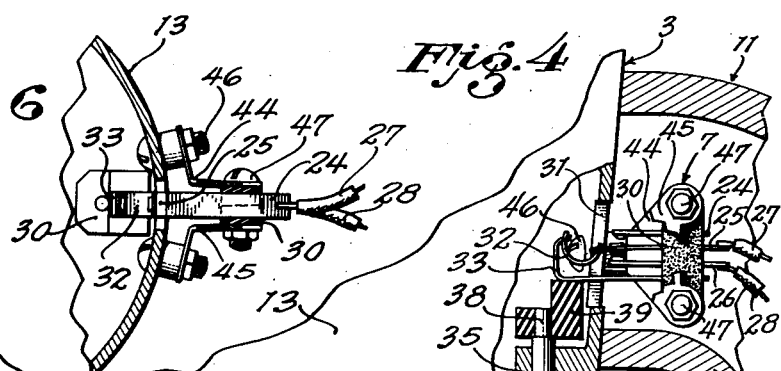
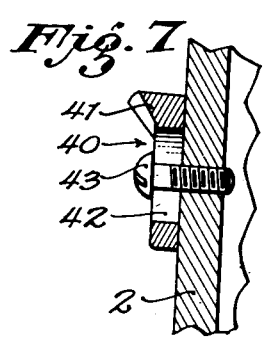
INVENTOR,
PAUL SCHILDKNECHT
BY
ATTORNEY

INVENTOR,
PAUL SCHILDKNECHT
BY
ATTORNEY

Patented June 6, 1950

2,510,934

UNITED STATES PATENT OFFICE 2,510,934

MIXER

Paul Schildknecht, Los Angeles, Calif., assignor, by direct and mesne assignments, to Machine-Craft Mfg. Co., Los Angeles, Calif., a corporation of California Application September 2, 1947, Serial No. 771,653

3 Claims. (Cl. 259—108)

The present invention relates to mixers of the type adaptable for mixing so-called heavy malts, which are largely ice cream, or the mixing of liquids of any form.

The invention has for an object the provision of a mixer which has its parts so arranged that when a container holding the ingredients to be mixed is placed in a definite position, the motor for the said mixer is automatically energized.

A further object is the provision in a mixer of a construction adapted to support containers of various sizes.

A further object is the provision of a mixer which functions to permit a container holding liquid to be positioned in a certain location relative to the agitating element and which, when the container is so positioned, automatically energizes the motor to drive the agitator.

A further object is the provision, in a mixer, of means adapted to prevent any spillage of liquid from the container due to agitating the liquid.

A further object is the provision of a mixer construction wherein the operator is enabled to control agitator action as the liquid in a container is brought into contact with the agitator.

With respect to the foregoing object, the average mixer comprises a motor-driven agitator, the agitator being received within a container holding a liquid. At a rule, a switch is thrown when the agitator is completely within the liquid, with the result that the motor is not always able to move the agitator, particularly if the ingredients are viscous. Such a contingency is effectively overcome with the present invention.

Further objects include a mixer which is simple in construction, fool-proof in operation, economical in cost of manufacture, and generally superior to mixers now known to the inventor.

With the above mentioned and other objects in view, the invention consists in the novel and useful provision, formation, construction, association, and relative arrangement of parts, members, and features, all as shown in a certain embodiment in the accompanying drawings, described generally, and more particularly pointed out in the claims.

In the drawings:

Figure 1 is a front elevation of the improved mixer,

Figure 2 is a side elevation of the mixer shown in Figure 1,

Figure 4 is a fragmentary detail, partly in section and on an enlarged scale, of certain elements of the invention, and specifically showing the relationship which exists between a cover and a switch associated with the motor.

Figure 6 is a fragmentary sectional view on the line 6—6 of Figure 3, and,

Figure 7 is a fragmentary sectional view, on an enlarged scale, taken on the line 7—7 of Figure 1.

Figure 3:
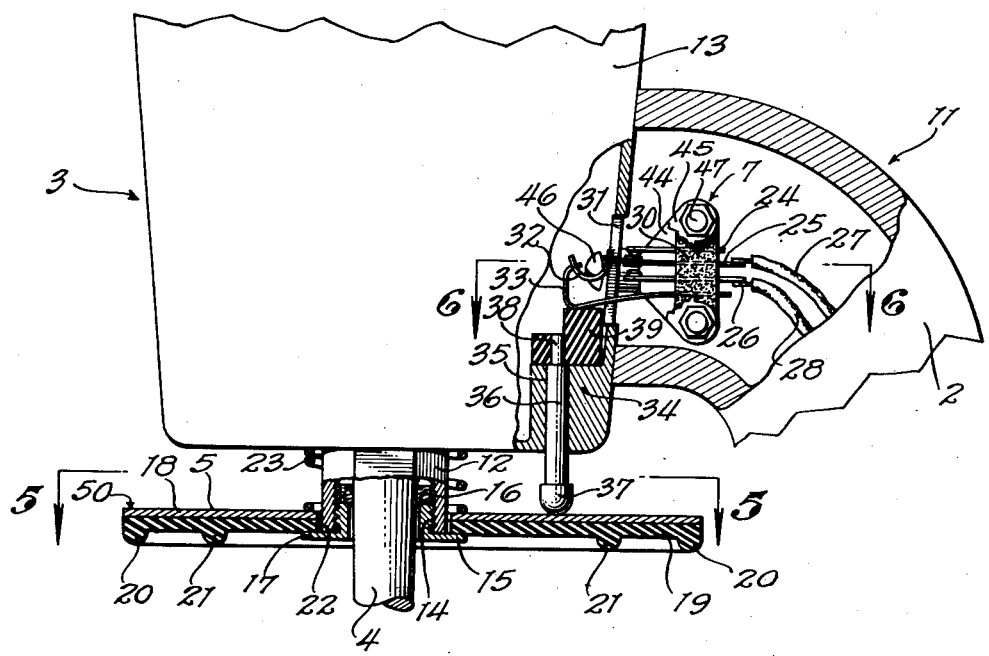
Figure 3 is a fragmentary view, partly in section, taken on the line 3—3 of Figure 1, and on an enlarged scale.

Referring now with particularity to the drawings, the improved mixer is designated as an entirety by 1, and the same includes a stand 2 formed to carry at its upper end a motor 3, associated with an agitator shaft 4, a cover 5 adapted to cooperate with a container 6 in such a manner as to cap the container and close a switch 7, and whereby the motor 3 is energized, all of which elements are utilized in the practice of one embodiment of the invention.

While the stand 2 may be of any form, yet I prefer to have the front face 8 thereof of concave cross section, as such a structure permits reception within the said concavity of a portion of the container 6, and acts to hold sides of the container so that it does not shift during agitator action therein. This construction adds to the ornamental appearance of the stand and permits the forward face thereof to be gradually curved so as to merge with base 9, which base is mounted upon the cushion feet 10. Such a construction provides a goose neck 11 at the upper end thereof, which portion carries the motor 3, the motor being secured thereto in any convenient manner.

Figure 5:
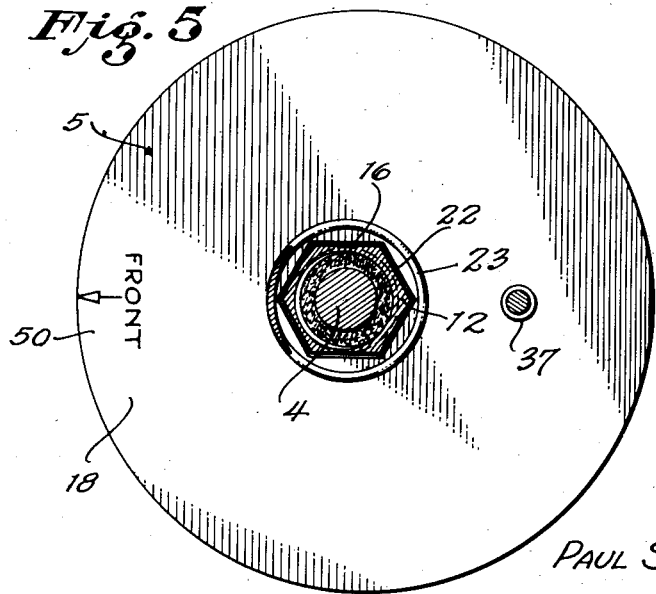
Figure 5 is a sectional view on the line 5—5 of Figure 3.

The agitator shaft 4 projects through a bearing 12, the bearing being supported by the motor casing 13. This bearing is provided with an internally screw-threaded portion 14, the threads of which accommodate a gland-type nut 15, the gland being shown at 16. The gland 16 may take the form of a felt washer. The gland nut has a flange 17 of greater diameter than the external diameter of the bearing 12. The cover 5 includes a disc 18, which forms a backing for facing 19, which may be rubber, or other substance, which facing is provided with spaced concentric beads 20 and 21. The disc 18 and facing 19 are provided with an eccentric bore 22, through which is passed bearing 12, the cover resting on the flange 17. Interposed between the motor casing and the cap, and surrounding the bearing 12, is a coil spring 23. This spring constantly urges the cover against the flange 17 (see Figure 3). As shown in Figure 5, the external surface of the bearing may take a hexagonal form, although within the purview of the invention, any other form may be utilized.

The switch 7 is of the micro-type and has three contact arms 24, 25 and 26, the intermediate arm 25 being movable to contact arm 24 or arm 26. Leads 27 and 28 are connected to the arms 25 and 26, and to a circuit which includes the motor 3, and a source of current supply. See the leads in Figure 2, at 29. This switch is of conventional form and is obtainable on the market, for which reason a detailed description thereof will not be made, save and except to state that the switch arms are suitably carried on insulation 30, the insulation in turn being secured to the casing 13 of the motor. As shown in Figure 3, the gooseneck portion 11 of the stand or pedestal is hollow so as to accommodate the switch. In this respect, it is to be observed that the casing 13 of the motor is provided with an opening or slot 31 whereby means associated with the switch may be actuated in a manner hereinafter to be detailed.

The switch arm 25 is elongated and has a portion that is passed through the opening or slot 31, the same carrying a semi-circular member 32, which is carried at one end by arm 33. Arm 33 is of spring-like material and is supported by the insulation 30 of the switch. The structure is such that when the arm 33 is moved upwardly, a toggle action results between the switch arm 25 and the semi-circular member 32. The result is a snap action so far as the switch arm is concerned.

Within the motor casing is a block 34 provided with a through bore 35, which bore accommodates a pin 36 having a head portion 37 adapted to engage the upper surface of the cover 5. The pin has a reduced diameter portion 38, which is passed through a bore in an insulation block 39. This insulation block engages arm 33 of the switch.

Within the concavity 8 of the pedestal or stand is a container support 40 (see Figure 7). This support is segmental in form and provided with a thickened edge flange 41, and with an elongated slot 42. A screw 43 is passed through the slot and is threaded to the stand, the arrangement being such as to allow the support to be raised or lowered in accordance with container height. The support is transversely curved in order to give support to the base of the container 6.

The operation, uses and advantages of the invention just described are as follows:

The invention incorporates within its structure the micro-switch 7, details of which are shown in the several figures, such as Figures 3, 4 and 6, Figure 6 showing one method whereby the switch itself may be supported by the casing 13 of the motor, which is to say it is provided with a pair of brackets 44 and 45, which are secured to the casing by screws designated generally as 46, while the outer ends of said brackets are secured to the insulation members 30 by screws, or the like, designated generally as 47. In this manner, the micro-switch is held in position and likewise in assemblage.

If we assume use of a container 6 of the type shown in the drawings, the support 40 is adjusted so that when the container base engages the flange 41 of the support, the cover 18 will be elevated sufficiently to move the pin 36 upwardly to operate the micro-switch and close an electrical circuit to the motor. Conversely, when the container is removed from the support 40, the micro-switch will, under actuation of the arm 33, move the pin 36 downwardly to open the circuit to the motor and stop motor operation. For instance, in Figure 3, the arm position is such that an electrical circuit is not completed to the motor, but when the cover 18 is elevated to the position shown in Figure 4, the micro-switch is operated, due to the fact that the pin 36 is elevated, which moves the block 39 against the arm 33 and causes toggle action between the members 32 and arm 25 to move the contact portion of the arm 25 into engagement with the contact portion of arm 26.

Assuming that the operator has placed a liquid or a semi-fluid mass within the container 6, he then lowers the agitator shaft 4 within the mass in the container. This agitator shaft carries agitators of some form thereon, as shown at 48 and 49. If the mass is quite viscous or stiff, the operator may desire to have the motor in operation prior to actually positioning the container on its support, in which event, as he elevates the container, he depresses portion 50 of the cover so that the cover is elevated on the opposite side and moves the pin 36 upwardly to close the circuit through the micro-switch. Hence, progressive upward movement of the container allows the agitator to operate upon the mass therein. On the other hand, if a liquid is within the container, the operator may move the container upwardly so as to position the agitator shaft within the liquid, and as the operator elevates the container, he brings the rim of the container into engagement with the gasket material 19 of the cover 18. The container rim will be positioned either between the beads 20 and 21 or perhaps positioned within the confines of the bead 21, depending upon container rim diameter. However, this gasket or sealing material functions to seal the rim of the container so that spilling of the liquid therein does not occur. Hence, the container is sealed prior to agitator operation. After the container is sealed, further movement upwardly to position the base of the container on its support will move the pin upwardly a sufficient amount to close the micro-switch, whereupon the motor is energized and the agitator will mix the liquid therein. The cover is eccentric relative to the bearing 12 so that the container, when carried upon its support, will have the agitator shaft eccentric to the axis of the container. In this manner, I obtain a proper beating action.

The coil spring 23 at all times urges the cover 18 in one direction.

The device is attractive in appearance, and assures that the material will not splash prior to or during an agitating action.

I claim:

1. A mixer including a motor, a pedestal for supporting the motor, said motor provided with an agitator shaft, a bearing carried by the motor and in part surrounding the shaft, said bearing provided with a gland nut having a flange, a cover for a container provided with a bore through which said bearing is passed, the said flange of the gland nut acting as a support for the cover, a coil spring surrounding the bearing and interposed between the motor and a surface of the cover, for resiliently maintaining said cover on the gland nut flange, a container and means on the pedestal for supporting the container in a position to press the cover upwardly against the coil spring.

2. A mixer including a motor, a pedestal for supporting the motor, said motor provided with an agitator shaft, a bearing carried by the motor and in part surrounding the shaft, said bearing provided with a gland nut having a flange, a cover for a container provided with a bore through which said bearing is passed, the said flange of the gland nut acting as a support for the cover, a coil spring surrounding the bearing and interposed between the motor and a surface of the cover, for resiliently maintaining said cover on the gland nut flange, a container and means on the pedestal for supporting the container in a position to press the cover upwardly against the coil spring, in combination with a switch for controlling an electric circuit to the motor and actuated by upward movement of the cover.

3. A mixer including a pedestal, an electric motor provided with an adjustor shaft, the said motor supported by said pedestal, a circular cover for a container, the said cover provided with an eccentric opening through which the said agitator shaft is passed, a coil spring spacedly surrounding the agitator shaft and positioned between the motor and the cover, the said cover being tiltable against spring compression; means for limiting downward movement of the cover on the said shaft; and a switch in circuit with the motor and with a source of electric power and adapted to be closed when the cover is tilted and raised against spring compression.

PAUL SCHILDKNECHT.

REFERENCES CITED

The following references are of record in the file of this patent:

UNITED STATES PATENTS

| Number | Name | Date |
| --- | --- | --- |
| 1,351,243 | Graves | Aug. 31, 1920 |
| 1,491,991 | Lacy et al. | Apr. 29, 1924 |
| 1,503,943 | Flegel | Aug. 5, 1924 |
| 1,713,119 | Flegel | May 14, 1929 |
| 1,764,338 | Nielsen | June 17, 1930 |
| 2,184,085 | Ruetz | Dec. 19, 1939 |

FOREIGN PATENTS

| Number | Country | Date |
| --- | --- | --- |
| 412,030 | Great Britain | June 21, 1934 |